United States Patent
Oda et al.

(10) Patent No.: US 7,185,491 B2
(45) Date of Patent: Mar. 6, 2007

(54) STEAM ENGINE

(75) Inventors: Shuzo Oda, Kariya (JP); Shinichi Yatsuzuka, Chiryu (JP); Yasumasa Hagiwara, Kariya (JP); Toshiyuki Morishita, Nagoya (JP)

(73) Assignee: Denso Corporation, Kariya (JP)

( * ) Notice: Subject to any disclaimer, the term of this patent is extended or adjusted under 35 U.S.C. 154(b) by 100 days.

(21) Appl. No.: 11/146,174

(22) Filed: Jun. 6, 2005

(65) Prior Publication Data

US 2005/0268611 A1 Dec. 8, 2005

(30) Foreign Application Priority Data

Jun. 8, 2004 (JP) ............................. 2004-170087
Jun. 8, 2004 (JP) ............................. 2004-170088

(51) Int. Cl.
*F01B 1/00* (2006.01)
(52) U.S. Cl. ..................... 60/508; 60/512; 60/645; 60/670
(58) Field of Classification Search ................ 60/508, 60/512, 515, 645, 670
See application file for complete search history.

(56) References Cited

U.S. PATENT DOCUMENTS

| | | | | |
|---|---|---|---|---|
| 3,889,470 A | * | 6/1975 | Szewalski | .................. 60/647 |
| 4,060,988 A | * | 12/1977 | Arnold | ..................... 60/641.2 |
| 4,340,111 A | * | 7/1982 | Skala | ......................... 165/61 |
| 6,931,852 B2 | * | 8/2005 | Yatsuzuka et al. | ............ 60/670 |
| 6,973,788 B2 | * | 12/2005 | Oda et al. | ..................... 60/645 |
| 6,976,360 B1 | * | 12/2005 | Yatsuzuka et al. | ............ 60/645 |
| 7,073,331 B2 | * | 7/2006 | Oda et al. | ..................... 60/508 |
| 2004/0060294 A1 | * | 4/2004 | Yatsuzuka et al. | ............ 60/670 |

FOREIGN PATENT DOCUMENTS

JP     A-7-180649     7/1995

* cited by examiner

*Primary Examiner*—Hoang Nguyen
(74) *Attorney, Agent, or Firm*—Harness, Dickey & Pierce, PLC

(57) ABSTRACT

A steam engine has a looped fluid container, in which working fluid is filled. A heating device, a cooling device and an output device are arranged at the fluid container. A lower side valve is provided at a fluid passage of the fluid container between the heating device and the output device. An upper side valve is provided at another fluid passage of the fluid container between the cooling device and the output device. The upper and lower valves are respectively controlled to open and close the respective fluid passages at proper timings, to increase heat efficiency.

19 Claims, 8 Drawing Sheets

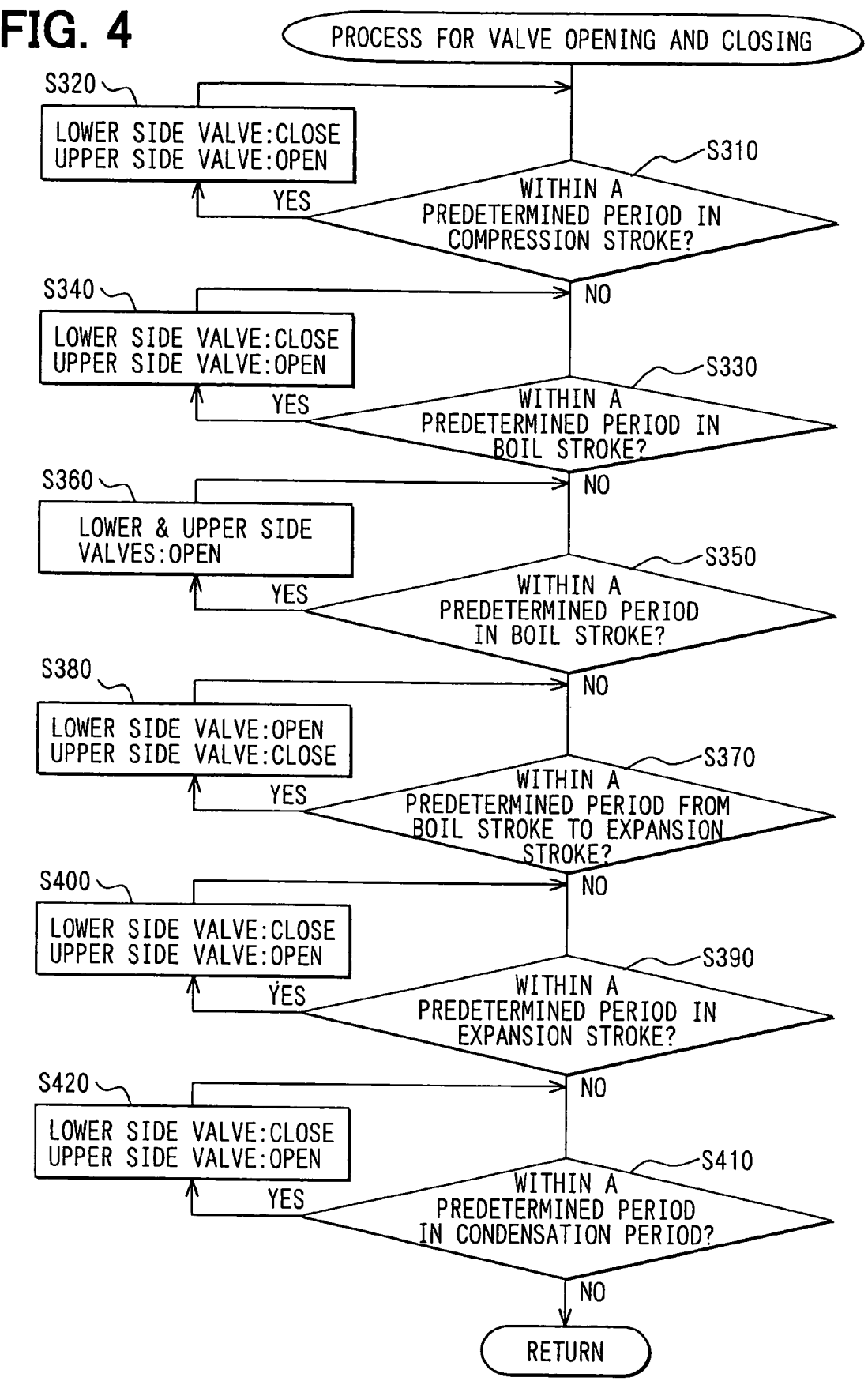

STEAM ENGINE

CROSS REFERENCE TO RELATED APPLICATION

This application is based on Japanese Patent Applications Nos. 2004-170087 and 2004-170088 filed on Jun. 8, 2004, the disclosures of which are incorporated herein by reference.

FIELD OF THE INVENTION

The present invention relates to a steam engine having a fluid container, in which working fluid is filled and the working fluid is vibrated in the fluid container in a self-excited vibrating manner as a result of a repeated operation of vaporization and liquefaction of the working fluid by heating and cooling the working fluid.

BACKGROUND OF THE INVENTION

An apparatus for a steam engine is known in the art, for example as disclosed in Japanese Patent Publication No. H7-180649, in which the energy is obtained by repeating vaporization and liquefaction of a fluid.

In the above apparatus, a volatile fluid is filled in a heating chamber, wherein the fluid is vaporized by heating the same and the vaporized fluid is introduced into a vertically arranged fluid pipe and guided to an upper portion of the fluid pipe. Then, the vaporized fluid is cooled and liquidized in a cooling chamber provided at the upper portion of the fluid pipe. The liquidized fluid returns to the heating chamber through the fluid pipe. A magnetic member is movably provided in the fluid pipe, so that a reciprocal movement of the magnetic member is generated in response to the movement of the fluid. An electric power is generated by producing electromotive force at a coil provided at an outside of the fluid pipe.

The applicant of the present invention has proposed a steam engine, as disclosed in Japanese Patent Publication No. 2004-84523 (which corresponds to U.S. Patent Publication No. 2004/0060294 A1). The steam engine is shown in FIG. 8.

The steam engine 500 comprises a loop pipe 502 having a circular pipe filled with the working fluid, a heating device 504 for heating the working fluid in the loop pipe 502, a cooling device 506 for cooling steam vaporized by the heating device 504, an output device 508, and a valve 520 for opening and closing the loop pipe 502.

The output device 508 comprises a cylinder 510, a piston 512 reciprocating in the cylinder 510, a moving member 514 connected at its one end to the piston 512, and a spring 516 connected to the other end of the moving member 514. The piston 512 moves in the cylinder 510 in a reciprocating manner according to pressure from the working fluid.

In the above steam engine 500, volumetric expansion of the working fluid occurs in the loop pipe 502, when the working fluid is heated and vaporized by the heating device 504. The vaporized steam heated by the heating device 504 moves upwardly toward the cooling device 506, at which the steam is cooled and liquidized. Then the volume of the working fluid in the loop pipe 502 is contracted. The piston 512 and the moving member 514 are reciprocated by change of liquid surface (self-excited vibration) as the pressure change due to the volumetric expansion and contraction of the working fluid in the loop pipe 502.

For example, a permanent magnet is disposed at the moving member 514 and a coil is faced to the permanent magnet, so that reciprocating piston 512 and the moving member 514 energize the coil.

As described above, in the steam engine 500 illustrated in FIG. 8, the vaporized steam heated at the heating device 504 moves upwardly toward the cooling device 506, at which the steam is cooled and liquidized.

Accordingly, in the loop pipe 502, the working fluid moves in one direction corresponding to the moving direction of the steam. In the steam engine 500, the velocity of the working fluid in the loop pipe 502 can be controlled by opening and closing of the valve 520. The control of the working fluid velocity can be used for controlling a time to exchange the heat of the working fluid in the loop pipe 502 with that of the cooling device 506 or the heating device 504.

It is, however, disadvantageous in the above steam engine 500 having one valve 520, in that heat efficiency is not sufficiently high. In this steam engine 500, for example, the movement of the working fluid located in the loop pipe 502 and at a place heated by the heating device 504 can be suppressed by closing the valve 520.

In this case, the vaporization of the working fluid heated by the heating device 504 is expedited, so that a larger volume of the vaporized steam is generated in the loop pipe 502 adjacent to the heating device 504.

Then, when the valve 520 is opened, the steam moves upwardly toward the cooling device 506 at once, as shown in FIG. 8. When the steam moves upwardly in such a manner, the working fluid below the steam likewise moves upwardly through the heating device 504, wherein the working fluid is heated but not to the vaporized temperature.

In the case that the working fluid passing through the heating device 504 is heated but not vaporized, the heat energy supplied to the working fluid, which passes through the heating device 504 as the liquid-phase working fluid, does not contribute to the volumetric expansion of the working fluid in the loop pipe 502, and thereby such energy can not be used for the reciprocal movement of the piston 512 and the moving member 514.

As above, a part of the heat energy is unnecessarily wasted in the above steam engine 500, the heat efficiency is decreased corresponding to such wasted heat energy.

The present inventors further considered a heating device shown in FIG. 9, which could be used as the heating device 504 shown in FIG. 8. As shown in FIG. 9, the heating device 504 has a fluid pipe 550, through which heated fluid, such as exhausted gas from an internal combustion engine of a vehicle, flows. The heating device 504 heats the working fluid in the loop pipe 502 by using the heat energy of the fluid passing through the fluid pipe 550. The fluid pipe 550 is constituted in such a manner that the heated fluid flowing in the fluid pipe 550 is contacted with a portion of the loop pipe 502 at which the working fluid is heated by receiving heat energy, and the heated fluid passes by the loop pipe 502.

In this case, the working fluid located at the heating portion receives the heat energy, the amount of which corresponds to the amount of the heat energy given to the heating portion from the heated fluid.

However, in such heating device 504, the amount of the heat energy given from the heated fluid passing through the fluid pipe 550 is small, so that the heat efficiency tends to be insufficient.

This problem will be further explained with reference to FIG. 10 in addition to FIG. 9. FIG. 10 shows relation between position and temperature of the heated fluid passing through the fluid pipe 550. As shown in FIG. 9, a reference "A" designates a position of the fluid pipe 550 at which the heated fluid is contacted with the loop pipe 502 for the first time, and a reference "B" designates a position of the fluid pipe 550 at which the heated fluid has passed by the loop pipe 502.

When the temperature of the position A is "TA" (Inlet Temperature) and the temperature of the position B is "TB" (outlet Temperature), relation between "TA" and "TB" is "TA">"TB" (as shown in FIG. 10), because the heated fluid gives the heat energy to the heating portion while moving from the position A to the position B.

When the amount of the heated fluid passing through the fluid pipe 550 is "m" and a specific heat of the heated fluid is "Cp", the amount of heat "Q" given to the heating portion of the loop pipe 502 from heated fluid is "m Cp (TA−TB)" at most, as shown in FIG. 10.

In FIG. 10, "Th" is a boiling temperature, "Tc" is a condensing temperature, and "Ta" is an air temperature. "TB" needs to be higher than "Th" (TB>Th) in order to properly vaporize the working fluid located at the heating portion by the energy of the heated fluid.

However, in the structure of the heating device shown in FIG. 9, the heated fluid having a higher temperature "TB" than the boiling temperature "Th" is emitted in such a manner that the heat energy of the heated fluid is not sufficiently used for heating the working fluid. Therefore, the heat efficiency tends to be insufficient.

SUMMARY OF THE INVENTION

The present invention is made in view of the above problems, and it is an object of the present invention to improve the heat efficiency of a steam engine.

According to a feature of the invention, a steam engine has a fluid container in which liquid-phase fluid is filled, a heating device for heating the liquid-phase working fluid in the fluid container and vaporizing the same, a cooling device for cooling down and liquidizing steam, and an output device for producing a mechanical energy from self-excited movement of the working fluid in the fluid container.

In the steam engine, the fluid container comprises a loop pipe for forming a circular fluid passage in which the working fluid is moved back and forth. The heating device, the cooling device and the output device are arranged in this order, and the heating device is located at a lower position than the cooling device.

The steam engine further comprises a first valve arranged in a passage portion of the loop pipe, which is formed between the heating device and the output device and bypasses the cooling device, for opening and closing the passage portion, and a second valve arranged in another passage portion of the loop pipe, which is formed between the cooling device and the output device and bypasses the heating device, for opening and closing the other passage portion.

According to the above feature, in which the steam engine has two valves for controlling the opening and closing of the loop pipe, the steam engine can be more flexibly designed. More specifically, volume of the steam, a position of the steam in the loop pipe, a velocity of the steam, and so on can be controlled with more flexibility.

For example, an amount of fluid, which will be heated by a heating device but not vaporized and upwardly moves toward a cooling device, can be suppressed to a small amount. As a result, heat efficiency can be correspondingly improved.

According to another feature of the present invention, a heating device has a heating pipe through which heating fluid flows, for example, exhausted gas from an internal combustion engine. The heating device further has a first heating portion provided at a first portion of the fluid container, at which the heat from the heating fluid is transmitted to the liquid-phase working fluid when the heating fluid passes through the first heating portion, and a second heating portion provided at a second portion of the container, at which the heat from the heating fluid is transmitted to the liquid-phase working fluid when the heating fluid passes through the second heating portion after having passed through the first heating portion.

According to the above feature of the invention, the working fluid in the fluid container is heated by the heating fluid at two different heating portions, so that the heat from the heating fluid can be sufficiently transferred to the working fluid. As a result, an efficiency of heat transfer from the heating fluid to the working fluid can be improved.

BRIEF DESCRIPTION OF THE DRAWINGS

The above and other objects, features and advantages of the present invention will become more apparent from the following detailed description made with reference to the accompanying drawings. In the drawings:

FIG. 4 is a flow chart showing opening and closing operation of valves of the second embodiment;

DETAILED DESCRIPTION OF THE PREFERRED EMBODIMENTS

The embodiments of the present invention will now be explained with reference to the drawings.

(First Embodiment)

Figure 1:
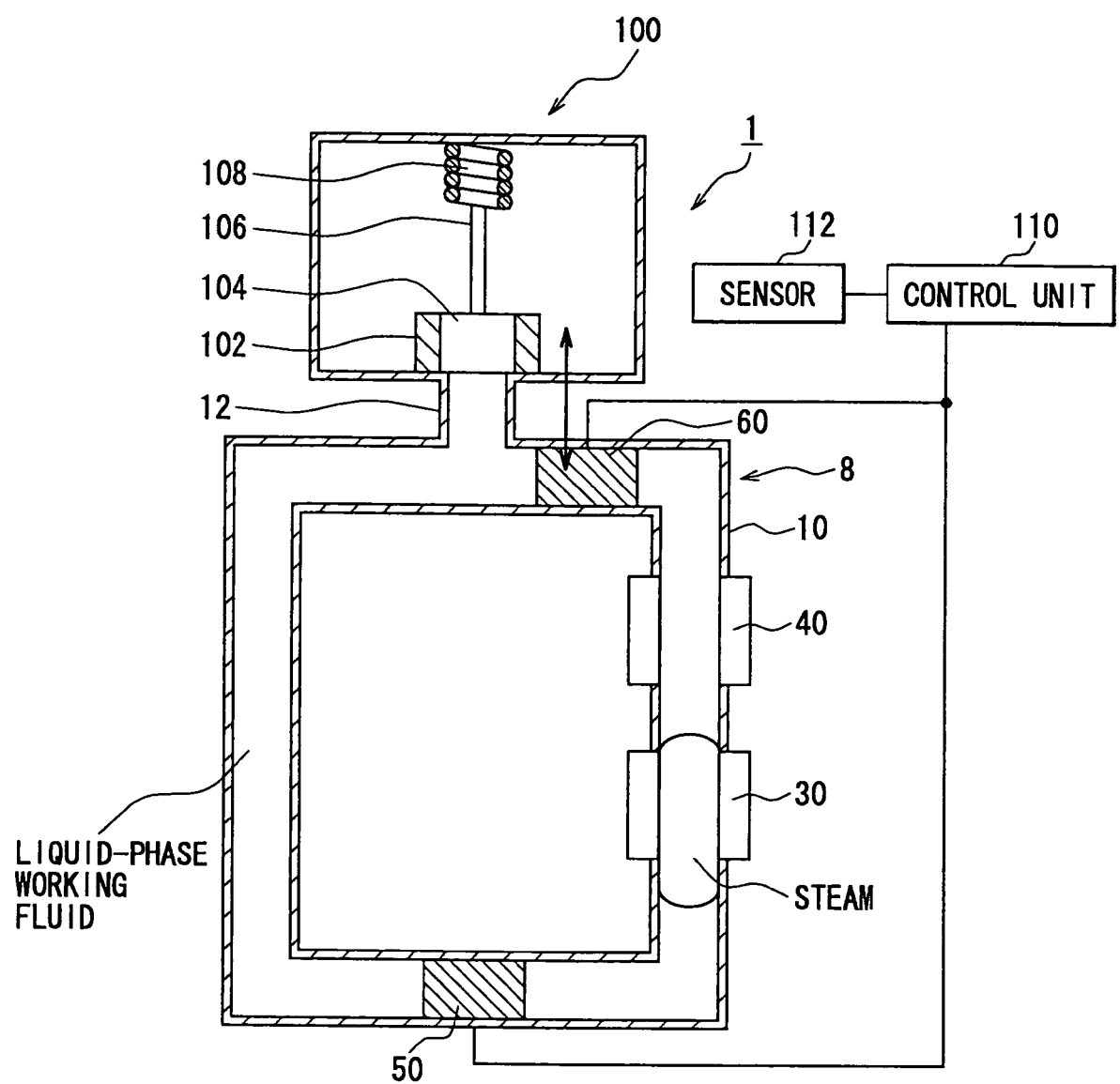
FIG. 1 is a schematic view showing a steam engine according to a first embodiment of the present invention.

FIG. 1 is a schematic view showing a steam engine 1 according to the first embodiment. As shown in FIG. 1, the steam engine 1 comprises a fluid container 8 including a loop pipe 10 in which liquid-phase working fluid, such as water, is filled with a predetermined pressure, a heating device 30, a cooling device 40, a lower side valve 50

(corresponding to a first valve), an upper side valve 60 (corresponding to a second valve), and an output device 100.

The heating device 30, the cooling device 40, and the output device 100 are provided in the loop pipe 10 in that order, and the heating device 30 is located below the cooling device 40.

The heating device 30 comprises, for example, a heat exchanger for partly heating and vaporizing the working fluid in the loop pipe 10. The cooling device 40 likewise comprises, for example, a heat exchanger for cooling and liquidizing the steam vaporized by the heating device 30. Both the heating device 30 and the cooling device 40 are provided at an outer surface of the loop pipe 10.

An outer wall portion of the loop pipe 10, at which the heating device 30 and the cooling device 40 are provided, is made of such material having a high heat conductivity as copper and aluminum, in order to efficiently heat or cool by the heating device 30 or the cooling device 40. The other wall portion of the fluid container 8 is preferably made of heat insulating material.

When the working fluid in the loop pipe 10 is heated and vaporized by the heating device 30, the volume of the working fluid expands. The vaporized steam heated by the heating device 30 moves upwardly toward the cooling device 40, at which the steam is cooled and liquidized. Then the volume of the working fluid in the loop pipe 10 is contracted. The change of liquid surface (self-excited vibration) is generated at the output device 100, due to the volumetric expansion and contraction of the working fluid in the fluid container 8.

Both the lower side valve 50 and the upper side valve 60 perform opening and closing of the passage in the loop pipe 10. The lower side valve 50 is provided in a passage portion bypassing the cooling device 40 between the heating device 30 and the output device 100. The upper side valve 60 is provided in a passage portion bypassing the heating device 30 between the cooling device 40 and the output device 100.

The output device 100 is provided at a passage portion bypassing the heating device 30 and the cooling device 40 between the lower side valve 50 and upper side valve 60. The output device 100 is connected to the fluid container 8 via a connecting pipe 12. The output device 100 generates the electric power according to the change of the liquid level (the self-excited level change) appearing in the connecting pipe 12.

The output device 100 comprises a cylinder 102 communicated with the connecting pipe 12, a piston 104 reciprocating in the cylinder 102, a moving member 106 connected at its one end to the piston 104, and a spring 108 connected to the other end of the moving member 106.

In the output device 100, the piston 104 reciprocates between a lower end (bottom dead center) and an upper end (top dead center) inside the connecting pipe 12 while keeping faced to the working fluid in the connecting pipe 12. A permanent magnet (not shown) is fixed to the moving member 106, and a coil (not shown) is provided at a position facing to the permanent magnet. The piston 104 and the moving member 106 are linearly reciprocated according to pressure change of the working fluid (the change of the liquid level) in the connecting pipe 12. The electromotive force and thereby the electric power is generated at the coil of the output device 100 according to the reciprocal movement of the moving member 106.

A controller (control unit) 110, which is comprised by an ordinary computer and so on, is connected to the upper side valve 60 and lower side valve 50. A position sensor 112, which detects a position of the piston 104 between the bottom dead center and the top dead center, is connected to the controller 110. The controller 110 outputs a control signal to each of the lower side valve 50 and upper side valve 60 according to the position detected by the position sensor 112, so that opening and closing operation of the lower side valve 50 and the upper side valve 60 can be respectively controlled.

Figure 2:
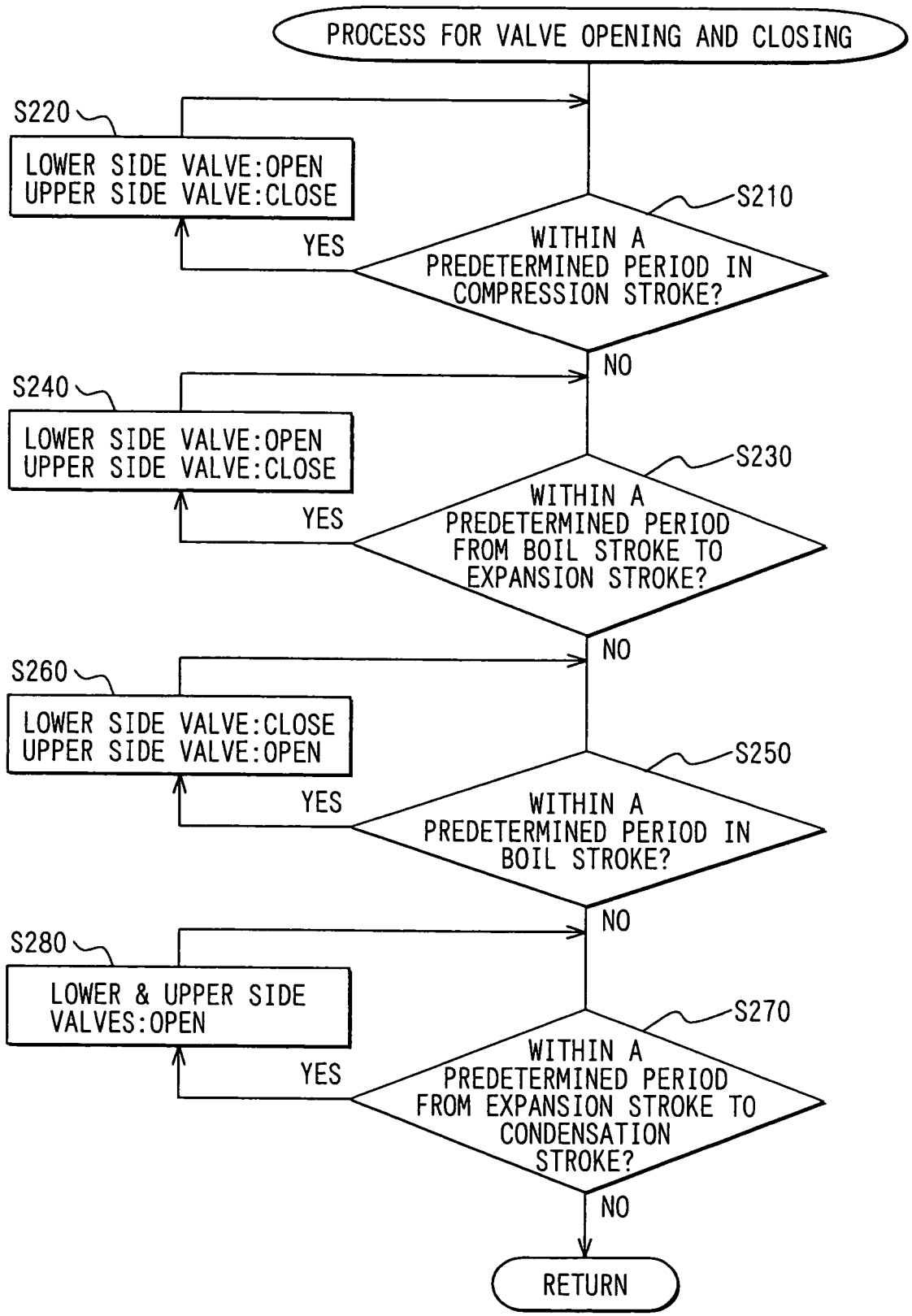
FIG. 2 is a flow chart showing opening and closing operation of valves of the first embodiment.
Figure 3:
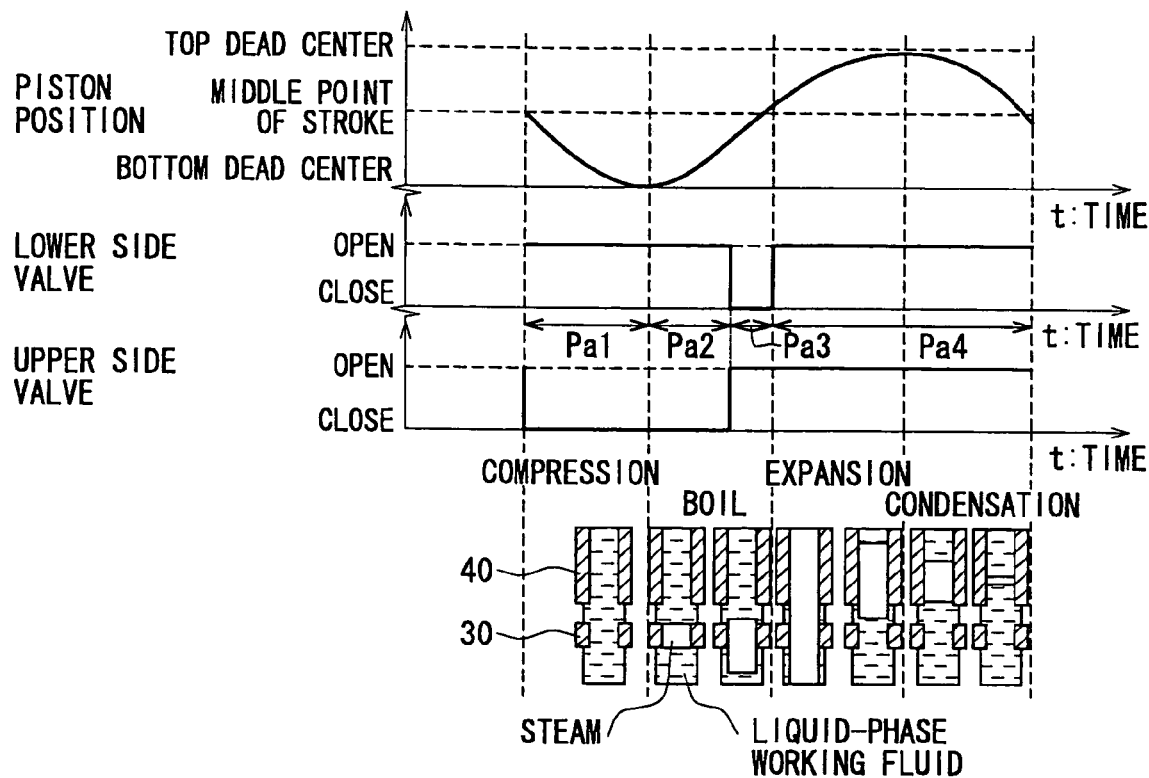
FIG. 3 is a timing chart showing detected positions by a position sensor, opening and closing condition of a lower side valve, and opening and closing condition of an upper side valve.

Referring now to FIG. 2 and FIG. 3, a process for performing opening and closing operation of the two valves by the controller 110 is explained. FIG. 3 is a timing chart showing detected positions of the piston 104 by the position sensor 112, opening and closing condition of the lower side valve 50, and opening and closing condition of the upper side valve 60.

Hereinafter, a stroke, in which the piston 104 moves from a middle point of its stroke to the bottom dead center, is defined as a compression stroke. A stroke, in which the piston 104 moves from the bottom dead center to the middle point of its stroke, is defined as a boil stroke. A stroke, in which the piston 104 moves from the middle point of its stroke to the top dead center, is defined as an expansion stroke. A stroke, in which the piston 104 moves from the top dead center to the middle point of its stroke, is defined as a condensation stroke. In FIG. 3, the compression stroke, the boil stroke, the expansion stroke, and the condensation stroke are respectively described as "compression", "boil", "expansion", and "condensation". FIG. 3 further shows a schematic condition of the steam existing adjacent to the heating device 30 and the cooling device 40. With respect to the stroke, in which two conditions of the steam are indicated in FIG. 3, the steam condition is changed from first left half to the latter right half of its stroke.

In this embodiment, the controller 110 repeatedly performs the opening and closing operation of the two valves. As shown in FIG. 2, when the controller 110 starts opening and closing operation of the two valves, the controller 110 determines whether the present time "t" is in a predetermined period "Pa1" of the compression stroke, at a step S210. The period "Pa1" is defined as the whole period of the compression stroke (shown as "Pa1" in FIG. 3).

When the controller 110 determines at the step S210 that the present time "t" is in the predetermined period "Pa1" (YES at the step S210), the process goes to a step S220. When the answer at the step S210 is NO, the process goes to a step S230.

At the step S220, the controller 110 outputs control signals to the lower side valve 50 and upper side valve 60, so that the lower side valve 50 is opened and the upper side valve 60 is closed. The controller 110 continuously performs the step S220 so long as the present time "t" is in the predetermined period "Pa1" (as shown by the step S210 and step S220 of FIG. 2, and as shown by the opened condition of the lower side valve and the closed condition of the upper side valve in "Pa1" of FIG. 3).

At the step S230, the controller 110 determines whether the present time "t" is in a predetermined period "Pa2" from the boil stroke to the expansion stroke. The predetermined period "Pa2" is defined as a period from the beginning of the boil stroke to a time point at which the period ends in the boil stroke (shown as "Pa2" in FIG. 3).

When the controller 110 determines at the step S230 that the present time "t" is in the predetermined period "Ps2" (YES at the step S230), the process goes to a step S240. In case of NO at the step S230, the process goes to a step S250.

At the step S240, the controller 110 outputs control signals to the lower side valve 50 and upper side valve 60, so that the lower side valve 50 is kept opened and the upper side valve 60 is kept closed. The controller 110 continuously performs the step S240 so long as the present time "t" is in the predetermined period "Pa2".

According to the embodiment, the periods "Pa1" and "Pa2" are set as one continuous period, so that the condition, in which the lower side valve 50 is opened and the upper side valve 60 is closed, is continuously kept during the period "Pa1" and the period "Pa2".

The controller 110 determines at the step S250 whether the present time "t" is in a predetermined period "Pa3" of the boil stroke. The period "Pa3" is defined as a period starting from the end of the period "Pa2" and ending at the end of the boil stroke.

When the controller 110 determines at the step S250 that the present time "t" is in the predetermined period "Pa3" (YES at the step S250), the process goes to a step S260. In case of NO at the step S250, the process goes to a step S270.

At the step S260, the controller 110 outputs control signals to the lower side valve 50 and upper side valve 60, so that the lower side valve 50 is closed and the upper side valve 60 is opened. The controller 110 continuously performs the step S260 so long as the present time "t" is in the period "Pa3".

The controller 110 determines at the step S270 whether the present time "t" is in a predetermined period "Pa4". The period "Pa4" is defined as a period covering whole periods of the expansion stroke and the condensation stroke (as shown in FIG. 3).

When the controller 110 determines at the step S270 that the present time "t" is in the predetermined period "Pa4" (YES at the step S270), the process goes to a step S280. In case of NO at the step S270, the process goes back to the top. The controller 110 continuously performs the valve opening and closing operation from the step S210 so long as the steam engine 1 is running.

At the step S280, the controller 110 outputs control signals to the lower side valve 50 and upper side valve 60, so that both the lower side valve 50 and the upper side valve 60 are opened. The controller 110 performs the step S280 so long as the present time "t" is in the period "Pa4".

As described above, in the present embodiment, the lower side valve 50 is opened and the upper side valve 60 is closed in the period "Pa1" in the compression stroke.

During the period "Pa1", the working fluid in the loop pipe 10 and adjacent to the heating device 30, which is not yet vaporized, receives the pressure from the piston 104 moving from the middle point of the stroke to the bottom dead center. However, an upward movement of the working fluid toward the cooling device 40 is suppressed because the upper side valve 60 is closed.

Accordingly, the working fluid adjacent to the heating device 30 efficiently receives the heat energy during the period "Pa1" because the working fluid is prevented from upwardly moving. The heat efficiency of the steam engine 1 is thus improved.

The lower side valve 50 and the upper side valve 60 are respectively kept opened and closed in the period "Pa2" of the boil stroke.

Steam is generated in the loop pipe 10 during the period "Pa2" by the heating device 30, to push down the liquid-phase working fluid in the loop pipe 10 (in a direction opposite to the cooling device 40). The piston 104 is thereby moved upwardly from the bottom dead center toward the top dead center.

As explained later, an upward movement of the steam is performed in the period "Pa4" from the expansion stroke to the condensation stroke. During the period "Pa4", the steam is at first expanded downwardly, before the upward movement of the steam starts.

An amount of the working fluid, which will be heated but not be vaporized by the heating device 30 during the upward movement of the working fluid in the period "Pa4", can be suppressed to a smaller amount due to the downwardly expanded steam.

Since the period "Pa1" and the period "Pa2" are made as one continuous period, the opening condition of the lower side valve 50 and the closing condition of the upper side valve 60 are continuously maintained from the period "Pa1" to the period "Pa2".

Therefore, the control process can be made easier in comparison with a case in that, for example, the period "Pa1" and the period "Pa2" are not the continuous period and thereby additional value opening and closing operation for the lower side valve 50 and upper side valve 60 is necessary between the period "Pa1" and the period "Pa2".

The lower side valve 50 is closed and the upper side valve 60 is opened in the period "Pa3", which includes the end of the boil stroke.

The steam is further generated by the heating device 30 during the period "Pa3", to upwardly push the liquid-phase working fluid due to the increased pressure. Since the lower side valve 50 is closed during the period "Pa3", the steam is upwardly expanded toward the cooling device 40. As a result, the piston 104 is further moved from the bottom dead center to the middle point of the stroke (as shown in the latter half of the boil stroke of FIG. 3. The steam upwardly extended is then liquefied by the cooling device 40.

Since the upward movement of the working fluid is facilitated during the period "Pa3", a velocity of volumetric change of the working fluid in the loop pipe 10 is increased and thereby a velocity of the reciprocating movement of the piston 104 is likewise increased.

According to the embodiment, the period "Pa3" is defined as a relatively short period just before the end of the boil stroke.

In other words, the remaining period of the boil stroke, which is defined as the period "Pa2", can be made as a longer period, when compared with such a case in that the period "Pa3" is set at an earlier timing of the boil stroke.

According to the embodiment, the longer period of "Pa2" is used as a period during which the steam generated by the heating device 30 is downwardly extended (since the upper side valve 60 is closed during the period of "Pa2"), and then the shorter period of "Pa3" follows to allow the steam to upwardly move by opening the upper side valve 60 and closing the lower side valve 50.

As a result, the amount of the working fluid, which will be heated but not be vaporized by the heating device 30 and move toward the cooling device 40 during the upward movement of the working fluid, can be made to a smaller amount and thereby the heat efficiency of the steam engine 1 can be improved.

Both the lower side valve 50 and the upper side valve 60 are opened in the period "Pa4" from the expansion stroke to the condensation stroke.

In this case, the buoyancy of the steam in the loop pipe 10 facilitates the upward movement of the working fluid (toward the cooling device 40).

Although the period "Pa1", in which the lower side valve 50 is opened and the upper side valve 60 is closed, is defined as a period covering the whole compression stroke in the embodiment, the period "Pa1" can be defined as a period covering only a part of the compression stroke.

Even in such a case, the working fluid adjacent to the heating device 30 can efficiently receive the heat energy from the heating device 30.

In the above embodiment, the period "Pa2", in which the lower side valve 50 is opened and the upper side valve 60 is closed, is defined as the period covering a part of the boil stroke. The period "Pa2" may be defined as a period covering a part of the expansion stroke. Further, the period "Pa2" may be defined as a period covering a part or the whole of the boil stroke and a part of the expansion stroke.

In each of these cases, the downward movement (in the direction opposite to the cooling device 40) of the steam generated by the heating device 30 can be obtained. As a result, the amount of the working fluid, which will be heated but not be vaporized by the heating device 30 and move toward the cooling device 40 during the upward movement of the working fluid, can be made to a smaller amount and thereby the heat efficiency of the steam engine 1 can be improved.

As described above, the steam in the loop pipe 10 is extended downwardly (in the direction opposite to the cooling device 40) in the period "Pa2", whereas the steam is upwardly extended (toward the cooling device 40) in the period "Pa3".

A center position of the steam in the vertical direction of the loop pipe 10 can be controlled by changing a ratio of the period "Pa2" with respect to the period "Pa3" (Pa2/Pa3).

For instance, the desired ratio (Pa2/Pa3) is in advance decided corresponding to characters of the respective steam engines through experiments, and the controller 110 may perform the control in response to the predetermined ratio (Pa2/Pa3).

As a further alternative, the controller 110 may include a center position detecting device (center detecting means) that detects a center position of the steam in the vertical direction. Then, the controller 110 may control the ratio (Pa2/Pa3) based on the detected center position by the center position detecting device.

More specifically, the controller 110 varies the ratio (Pa2/Pa3) based on the detected center position by the detecting device, so that the center position of the steam in the loop pipe 10 can be maintained at a predetermined position, which is, for example, lower than the bottom of the cooling device 40.

As above, the working fluid moving toward the cooling device 40 without vaporization is limited to a small amount, so that the heat efficiency of the steam engine 1 can be improved.

(Second Embodiment)

Next the second embodiment of the present invention will be explained.

The second embodiment is a modification of the first embodiment and an explanation similar to the first embodiment will be omitted or simplified.

According to the second embodiment, the structure of the steam engine is identical to the first embodiment. The second embodiment differs from the first embodiment in the following points.

The controller 110 carries out a valve opening and closing process as shown in FIG. 4 instead of FIG. 2.

Figure 5:
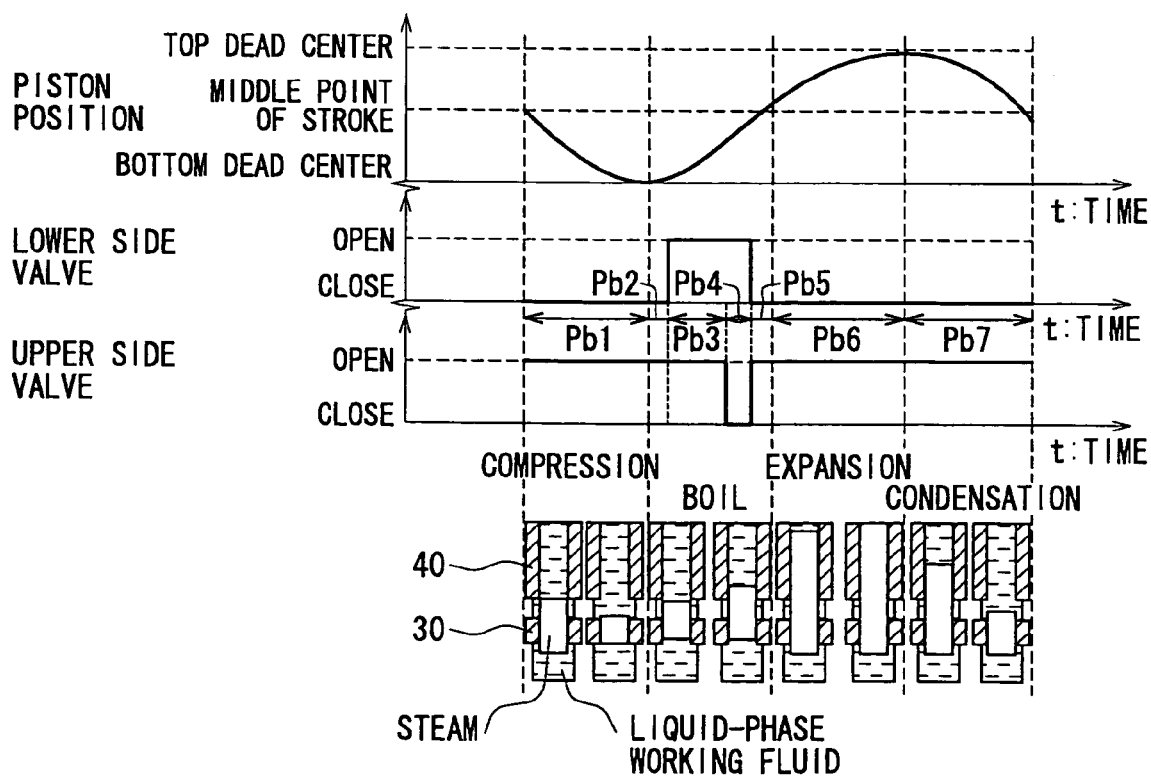
FIG. 5 is a timing chart showing detected positions by a position sensor, opening and closing condition of a lower side valve, and opening and closing condition of an upper side valve.

A process for opening and closing operation of the two valves by the controller 110 is explained by referring to FIG. 4 and FIG. 5. FIG. 5 is a timing chart showing detected position of the piston 104 by the position sensor 112, and opening and closing conditions of the lower side valve 50 and the upper side valve 60. In FIG. 5, the compression stroke, the boil stroke, the expansion stroke, and the condensation stroke are respectively described as "compression", "boil", "expansion", and "condensation", as in the same manner to FIG. 3. FIG. 5 further shows a schematic condition of the steam existing adjacent to the heating device 30 and the cooling device 40. Two conditions of the steam shown in each stroke of FIG. 5 indicate that the left side of the figure corresponds to the first half of the stroke and the right side of the figure corresponds to the latter half of the stroke.

In this embodiment, the controller 110 repeatedly performs the opening and closing operation of the valves. As shown in FIG. 4, when the controller 110 starts opening and closing operation of the valves, the controller 110 determines at a step S310 whether the present time "t" is in a predetermined period "Pb1" in the compression stroke. The period "Pb1" is defined as a period covering the whole compression stroke (shown as Pb1 in FIG. 5).

In case of YES at the step S310, the process goes to a step S320. In case of NO at the step S310, the process goes to a step S330.

At the step S320, the controller 110 outputs control signals to the lower side valve 50 and upper side valve 60, so that the lower side valve 50 is closed and the upper side valve 60 is opened. The controller 110 continuously performs the step S320 so long as the present time "t" is in the predetermined period "Pb1".

At the step S330, the controller 110 determines whether the present time "t" is in a predetermined period "Pb2" or a predetermined period "Pb5". The period "Pb2" is defined as a period starting from the beginning of the boil stroke to a timing point in the boil stroke (shown as Pb2 in FIG. 5). The period "Pb5" is defined as a period starting from another timing point in the boil stroke to the end of the boil stroke (shown as Pb5 in FIG. 5).

In case of YES at the step S330, the process goes to a step S340. In case of NO at the step S330, the process goes to a step S350.

At the step S340, the controller 110 outputs control signals to the lower side valve 50 and upper side valve 60, so that the lower side valve 50 is closed and the upper side valve 60 is opened. The controller 110 performs the step S340 so long as the present time "t" is in the period "Pb2" or "Pb5".

At the step S350, the controller 110 determines whether the present time "t" is in a predetermined period "Pb3" in the boil stroke. The period "Pb3" is defined as a period starting from the end of the period "Pb2" to a time point in the boil stroke (shown as Pb3 in FIG. 5).

In case of YES at the step S350, the process goes to a step S360. In case of NO at the step S350, the process goes to a step S370.

At the step S360, the controller 110 outputs control signals to the lower side valve 50 and upper side valve 60 to open both valves 50 and 60. The controller 110 performs the step S360 so long as the present time "t" is in the period "Pb3".

At the step S370, the controller 110 determines whether the present time "t" is in a predetermined period "Pb4" within the boil stroke. The period "Pb4" is defined as a period starting from the end of the period "Pb3" to the beginning of the period "Pb5" (shown as Pb4 in FIG. 5).

In case of YES at the step S370, the process goes to a step S380. In case of NO at the step S370, the process goes to a step S390.

At the step S380, the controller 110 outputs control signals to the lower side valve 50 and upper side valve 60, so that the lower side valve 50 is kept opened and the upper side valve 60 is closed. The controller 110 performs the step S380 so long as the present time "t" is in the period "Pb4".

At the step S390, the controller 110 determines whether the present time "t" is in a predetermined period "Pb6" of the expansion stroke. The period "Pb6" is defined as a period covering the whole expansion stroke (shown as Pb6 in FIG. 5).

In case of YES at the step S390, the process goes to a step S400. In case of NO at the step S390, the process goes to a step S410.

At the step S400, the controller 110 outputs control signals to the lower side valve 50 and upper side valve 60, so that the lower side valve 50 is kept closed and the upper side valve 60 is kept opened. The controller 110 performs the step S400 so long as the present time "t" is in the period "Pb6".

At the step S410, the controller 110 determines whether the present time "t" is in a predetermined period "Pb7" in the condensation stroke. The period "Pb7" is defined as the whole period in the condensation stroke (shown as Pb7 in FIG. 5).

In case of YES at the step S410, the process goes to a step S420. In case of NO at the step S410, the process goes back to the top. Then, the controller 110 performs the valve opening and closing operation from the step S310 so long as the steam engine 1 is running.

At the step S420, the controller 110 outputs control signals to the lower side valve 50 and upper side valve 60, so that those valves are respectively kept closed and opened. The controller 110 performs the step S420 so long as the present time "t" is in the period "Pb7".

In this embodiment, the periods "Pb6", "Pb7", and "Pb1" are defined as a continuous period (shown in FIG. 5). The condition that the lower side valve 50 is closed and upper side valve 60 is opened continues during the periods "Pb6", "Pb7", and "Pb1".

As described above, in the present embodiment, the lower side valve 50 is closed and the upper side valve 60 is opened in the period "Pb1" in the compression stroke.

The steam in the loop pipe 10 and adjacent to the heating device 30 is compressed during the period "Pb1", because the pressure is applied to the working fluid by the downward movement of the piston 104 from the middle point of the stroke toward the bottom dead center, as shown in FIG. 5. However, the position of the steam may not be largely moved, because the lower side valve 50 is closed during the period "Pb1".

In the period "Pb3" in the boil stroke, both the lower side valve 50 and the upper side valve 60 are opened.

The upward movement and expansion of the steam in the loop pipe 10 to the cooling device 40, which is heated and generated by the heating device 30, is facilitated by the buoyancy of the steam. As a result, the liquid-phase working fluid is facilitated to flow into a pipe portion, at which the heating device 30 is provided, so that the boil and vaporization of the working fluid by the heating device 30 are facilitated.

In the period "Pb3", the expansion of the steam in the loop pipe 10 is facilitated as a result of the boil and vaporization of the working fluid, so that a driving force can be efficiently given to the piston 104.

The lower side valve 50 is opened and the upper side valve 60 is closed in the period "Pb4" in the boil stroke.

The downward movement and expansion of the steam generated by the heating device 30 is facilitated in response to the upward movement of the piston 104 from the bottom dead center toward top dead center.

As explained later, the upward movement and expansion of the steam is most facilitated in the expansion stroke.

However, the steam is at first moved and expanded downwardly during the period "Pb4", before the upward movement and expansion of the steam start.

As a result, the amount of the working fluid, which will be heated but not be vaporized by the heating device 30 and move toward the cooling device 40 during the upward movement of the working fluid, can be made to a smaller amount and thereby the heat efficiency of the steam engine 1 can be improved, as in the same manner to the first embodiment.

The lower side valve 50 is closed and the upper side valve 60 is opened in the period "Pb6" in the expansion stroke.

During the period "Pb6", the upward movement and expansion of the steam generated by the heating device 30 in the loop pipe 10 is facilitated, so that the piston 104 is further upwardly moved from the middle point of stroke to the top dead center. The steam extended upwardly can be continuously liquefied by the cooling device 40.

In the period "Pb6", a velocity of volumetric change of the working fluid in the loop pipe 10 is increased and thereby a velocity of the reciprocating movement of the piston 104 is likewise increased.

The closed condition of the lower side valve 50 as well as the opened condition of the upper side valve 60 is maintained in the period "Pb6" in the condensation stroke.

During the period "Pb7", the steam generated by the heating device 30 remains in the loop pipe 10. The upward movement of the steam by the buoyancy is, however, suppressed because the lower side valve 50 is closed. The steam is downwardly contracted due to the liquefaction of the steam at the cooling device 40, according to the downward movement of the piston 104 from the top dead center to the middle point of the stroke.

Accordingly, the amount of the working fluid, which is heated by the heating device 30 without vaporization and moves toward the cooling device 40, can be suppressed to a small amount, even during the period "Pb7". The heat efficiency of the steam engine is correspondingly improved.

Furthermore, in the second embodiment, since the periods "Pb6", "Pb7", and "Pb1" are made as a continuous period, the closing condition of the lower side valve 50 and the opening condition of the upper side valve 60 are continuously maintained during the periods "Pb6", "Pb7", and "Pb1".

Therefore, in the second embodiment, the control process can be made easier when compared with a case in that the valves are independently operated for the respective periods "Pb6", "Pb7", and "Pb1".

In the second embodiment, although the period "Pb1", in which the lower side valve 50 is closed and the upper side valve 60 is opened, is defined as a period covering the whole compression stroke, the period "Pb1" can be defined as a period covering a part of the compression stroke.

Even with such an arrangement, a position of the steam (which is a position in the loop pipe 10 and adjacent to the heating device 30) is not largely changed.

The period "Pb3", in which both the lower side valve 50 and the upper side valve 60 are opened, can be changed to a different period so long as the different period is within the boil stroke. With such a modification, the boil and vaporization of the working fluid by the heating device 30 can be facilitated in the same manner.

Furthermore, the period "Pb4", in which the lower side valve 50 is opened and the upper side valve 60 is closed, is not necessarily defined as the period in the boil stroke. The period "Pb4" can be modified as a predetermined period covering a part of the expansion stroke, or covering a part of the boil stroke and a part of expansion stroke.

In each of the above modified embodiments, the downward movement of the steam generated by the heating device 30 in the loop pipe 10 can be facilitated. Accordingly, the amount of the working fluid, which is heated by the heating device 30 without vaporization and moves toward the cooling device 40, can be suppressed to a small amount, even during the period "Pb4", and the heat efficiency of the steam engine 1 can be improved.

The period "Pb6", in which the lower side valve 50 is closed and the upper side valve 60 is opened, can be also defined as a different period so long as the different period is within the expansion stroke. Even with such an arrangement, the velocity of the reciprocation of the piston 104 can be likewise increased.

The period "Pb7", in which the lower side valve 50 is closed and the upper side valve 60 is opened, can be modified as a different period so long as the different period is within the condensation stroke. With such a modification, the same operational effect can be obtained.

(Third Embodiment)

Figure 6:
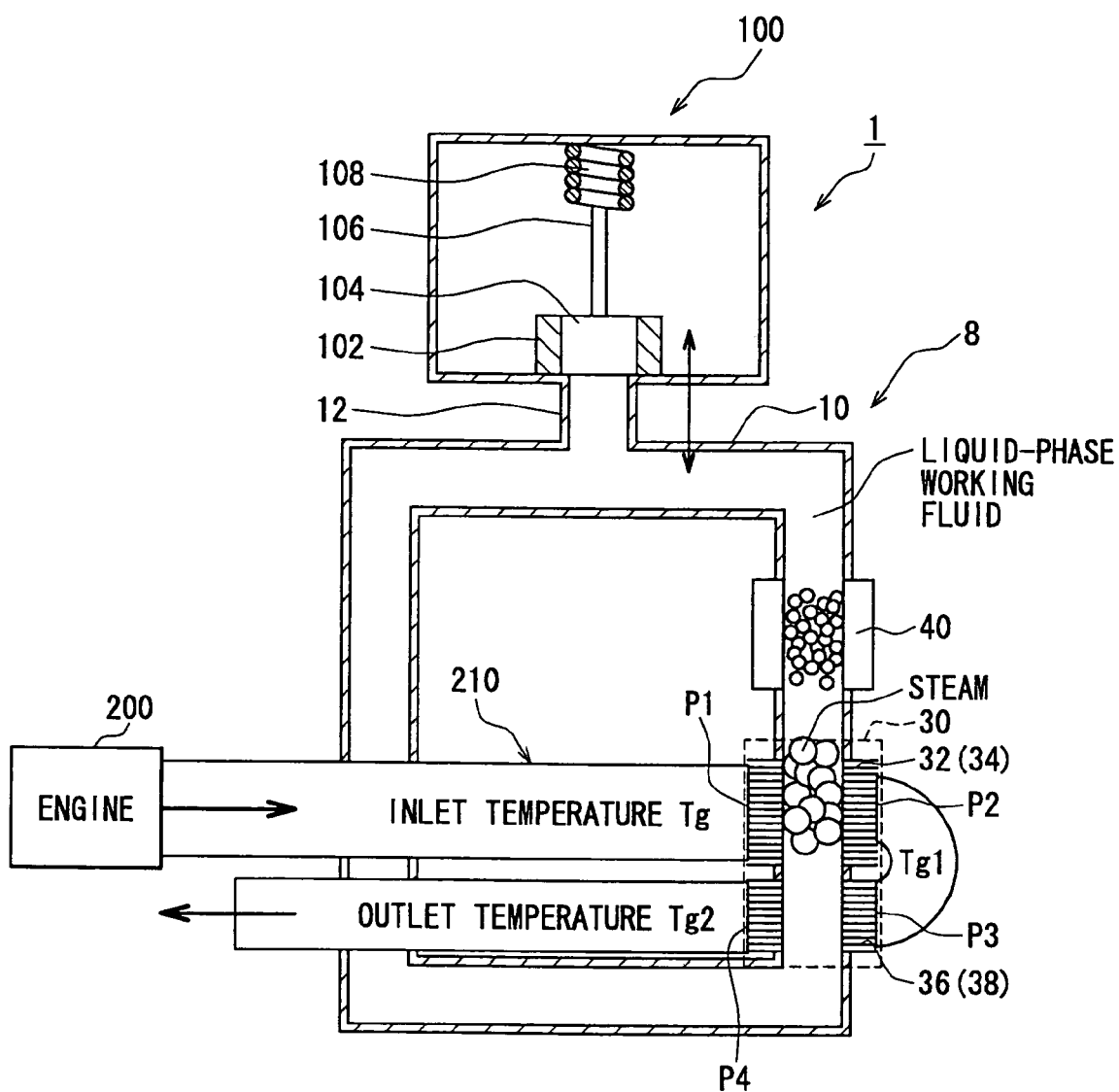
FIG. 6 is a schematic view showing a steam engine according to a third embodiment of the present invention.

A third embodiment of the present invention is explained with reference to FIG. 6, showing a modified engine steam 1. The third embodiment differs from the first or second embodiment in that the steam engine 1 does not include the lower side and upper side valves, but comprises an exhaust pipe. An explanation identical or similar to the first and second embodiments will be omitted or simplified.

In the steam engine 1 of the third embodiment, the heating device 30 comprises a first heating portion 32 and a second heating portion 36 (pre-heater). The first heating portion 32 is disposed at a first pipe portion of the loop pipe 10. The surface of the first pipe portion has a plurality of heat exchange fins 34 (corresponding to a surface area enlarging portion) made of such material having high heat conductivity, such as copper and aluminum.

The second heating portion 36 is disposed at a second pipe portion of the loop pipe 10 at a position lower than the first pipe portion. In the engine steam 1, the steam heated and generated by the heating device 30 moves upwardly, and then liquefied by the cooling device 40.

In the third embodiment, the working fluid moves in the loop pipe 10 in accordance with movement of the steam in a macroscopic model. Namely, the working fluid (including the steam) passes through the second heating portion 36 and then passes through the first heating portion 32.

A plurality of fins 38 is likewise formed at an outer surface of the second pipe portion of the second heating portion 36, in the same manner to the surface of the first pipe portion.

The first heating portion 32 is arranged adjacent to the second heating portion 36. The heating device 30 has an exhaust pipe 210 (corresponding to a heating fluid pipe) through which exhausted gas (corresponding to a heating fluid) emitted from an engine 200 flows.

The exhaust pipe 210 can be formed as a pipe through which all exhausted gas emitted from the engine 200 flows, or can be formed as a bypass pipe branched off from a main pipe, so that a part of the exhausted gas emitted from the engine 200 flows through the bypass pipe.

The exhaust pipe 210 is formed that the exhausted gas contacts the outer surfaces of both the first and second heating portions 32 and 36, when it passes through the exhaust pipe 210. More specifically, the exhausted gas passing through the exhaust pipe 210 contacts at first the outer surface (the fins 34) of the first heating portion 32, so that heat energy is transmitted from the exhausted gas to the working fluid. Then, the exhausted gas further flows and contacts the outer surface (the heat exchange fins 38) of the second heating portion 36, at which the heat energy of the exhausted gas is likewise transmitted to the working fluid.

The temperature of the working fluid located in the second heating portion 36 is increased from temperature "T1" to temperature "T2" by the heat energy supplied from the exhausted gas flowing through the exhaust pipe 210. The temperature "T2" is a temperature lower than boiling temperature "Th" of the working fluid filled in the fluid container 8. The temperature "T2" is preferably a temperature close to the boiling temperature "Th". Though the temperature "T2" is lower than the boiling temperature "Th", the temperature "T2" is better when it is closer to the boiling temperature "Th".

The working fluid located in the first heating portion 32 is vaporized by the heat energy given from the exhausted gas flowing through the exhaust pipe 210. In the steam engine 1, the working fluids filled in the fluid container 8, the pressure in the fluid container 8, the material of the first and second heating portions 32 and 36, the material and the surface area of the heat exchange fins 34 and 38, the flow amount of the working fluid in the first and the second heating portions 32 and 36, and the temperature and the flow amount of the exhausted gas flowing through the exhaust pipe 210, and so on are properly selected and decided for the respective steam engines 1 through the experiments, so that the temperature change and the vaporization of the working fluid can be properly performed.

Figure 7:
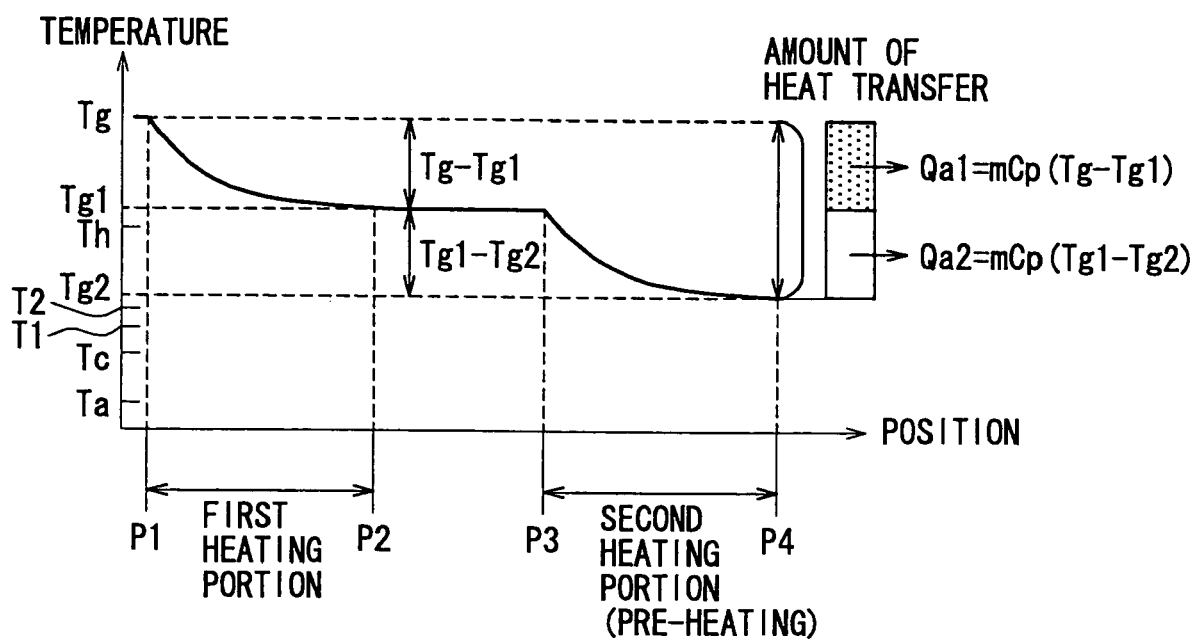
FIG. 7 is diagram showing relation between position and temperature of the heating fluid passing through a heating pipe.
Figure 8:
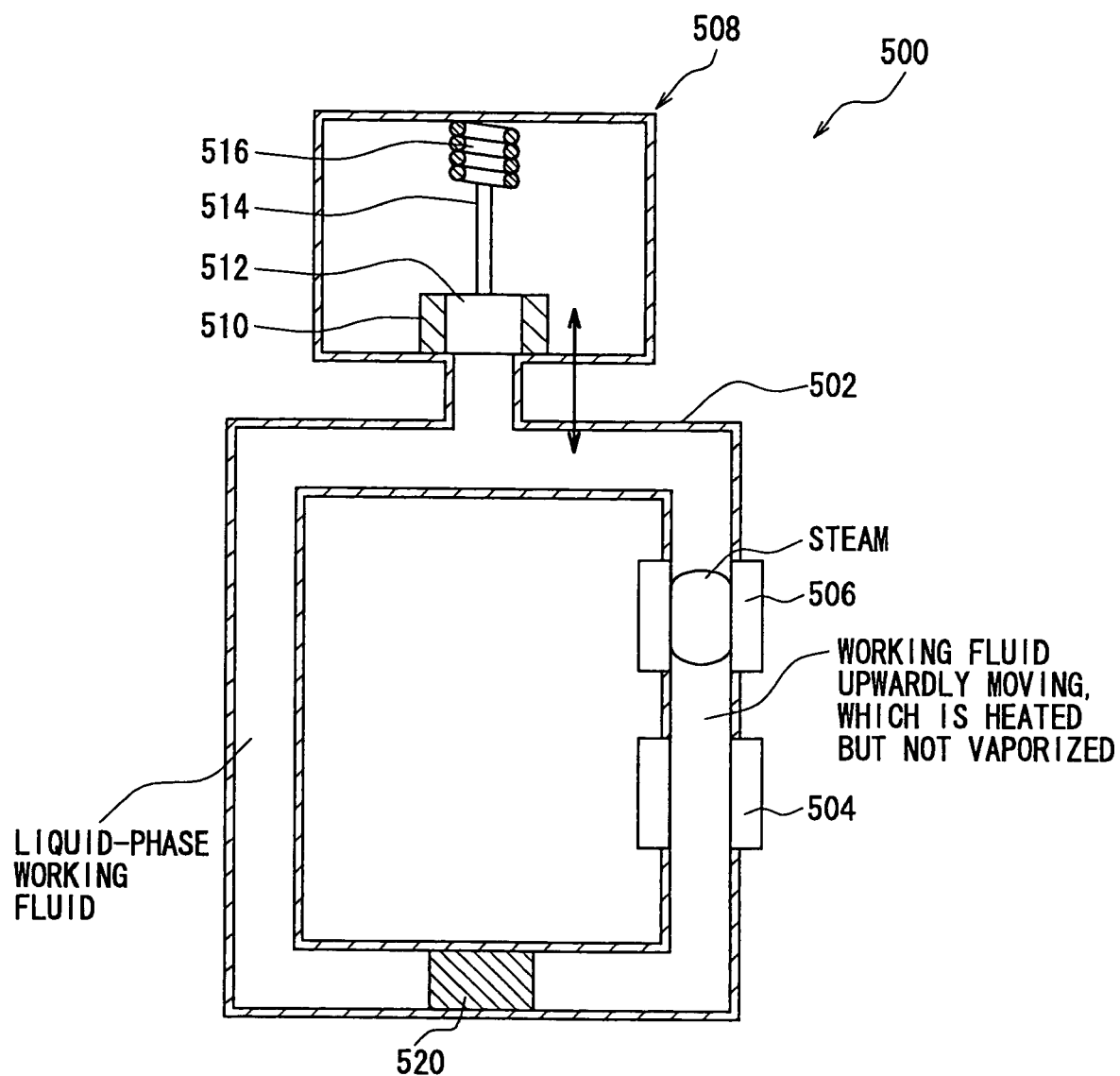
FIG. 8 is a schematic view showing a steam engine according to a related art.

Referring to FIGS. 6 and 7, an operation of the steam engine 1 is described hereinafter, in which the exhausted gas flowing through the exhaust pipe 210 supplies its heat energy to the working fluid in the loop pipe 10. FIG. 7 is a diagram showing relation between a position change and a temperature change of the exhausted gas flowing through the exhaust pipe 210.

As shown in FIG. 6, a position at which the exhausted gas flowing through the exhaust pipe 210 first contacts the outer surface of the first heating portion 32 is defined as "P1", and a position at which the exhausted gas passes over the outer surface of the first heating portion 32 is defined as "P2". A position at which the exhausted gas contacts the outer surface of the second heating portion 36 is defined as "P3", and a position at which the exhausted gas passes over the outer surface of the second heating portion 36 is defined as "P4".

A temperature of the exhausted gas at the position "P1" is defined as "Tg" (an inlet temperature), and a temperature of the exhausted gas at the position "P2" is defined as "Tg1" (an intermediate temperature). Relation between the "Tg" and "Tg1" is defined as "Tg">"Tg1" (as shown in FIG. 7) because the exhausted gas supplies the heat energy to the outer surface of the first heating portion 32 when it flows from the position "P1" to the position "P2", so that the working fluid located in the first heating portion 32 is vaporized.

Relation among the inlet temperature "Tg", the intermediate temperature "Tg1", and boiling temperature "Th" is defined as "Tg">"Tg1">"Th" (as shown in FIG. 7) in order to properly perform vaporization of the working fluid located in the first heating portion 32.

When an amount of the exhausted gas flowing through the exhaust pipe 210 is defined as "m" and a specific heat of the exhausted gas is defined as "Cp", a heat quality "Qa1" supplied to the outer surface of the first heating portion 32 during the exhausted gas flows from the position "P1" to the position "P2" is represented by "m Cp (Tg−Tg1)", as shown in FIG. 7, as its maximum value.

It is assumed that the temperature of the exhausted gas at the position "P3" is almost the same to the temperature "Tg1" at the position "P2" because there is no factor, by which a lot of the heating energy is absorbed, during the exhausted gas flows from the position "P2" to the position "P3". The temperature of the exhausted gas at the position "P4" is represented by "Tg2" (an outlet temperature).

The exhausted gas gives the heat energy to the outer surface of the second heating portion 36 while it flows from the position "P3" to the position "P4", so that the temperature of the working fluid in the second heating portion 36 rises from "T1" to "T2" and relation between "Tg1" and "Tg2" becomes "Tg1">"Tg2" (as shown in FIG. 7).

The temperature of the working fluid in the second heating portion 36 is increased from "T1" to "T2", which is lower than boiling temperature "Th", and relation among these temperatures can be represented by "Tg1">"Th"≧"Tg2">"T2">"T1" (as shown in FIG. 7).

A heat quantity "Qa2" supplied to the outer surface of the second heating portion 36, during a period in which the exhausted gas flows from the position "P3" to the position "P4", is represented as "m Cp (Tg1−Tg2)", as shown in FIG. 7, as its maximum value.

As described above, in the steam engine 1, the exhaust pipe 210 is formed that the exhausted gas contacts at first the outer surface of the first heating portion 32 and to supply the heat energy to the working fluid. And then, the exhausted gas passes through the second heating portion 36 to supply the heat energy to the working fluid.

As above, both the working fluid in the first heating portion 32 and the working fluid in the second heating portion 36 are heated by the heat energy from the exhausted gas. Particularly, the steam engine 1 of the embodiment is arranged in such a manner that the intermediate temperature "Tg1" of the exhausted gas is maintained at a temperature higher than the temperature "T1" of the working fluid in the second heating portion 36, although the temperature of the exhausted gas flowing through the exhaust pipe 210 is decreased from "Tg" to "Tg1", when the exhausted gas passes through the first heating portion 32.

Therefore, in this embodiment, the working fluid not only in the first heating portion 32 but also in the second heating portion 36 appropriately receives the heat energy from the exhausted gas flowing through the exhaust pipe 210.

Figure 9:
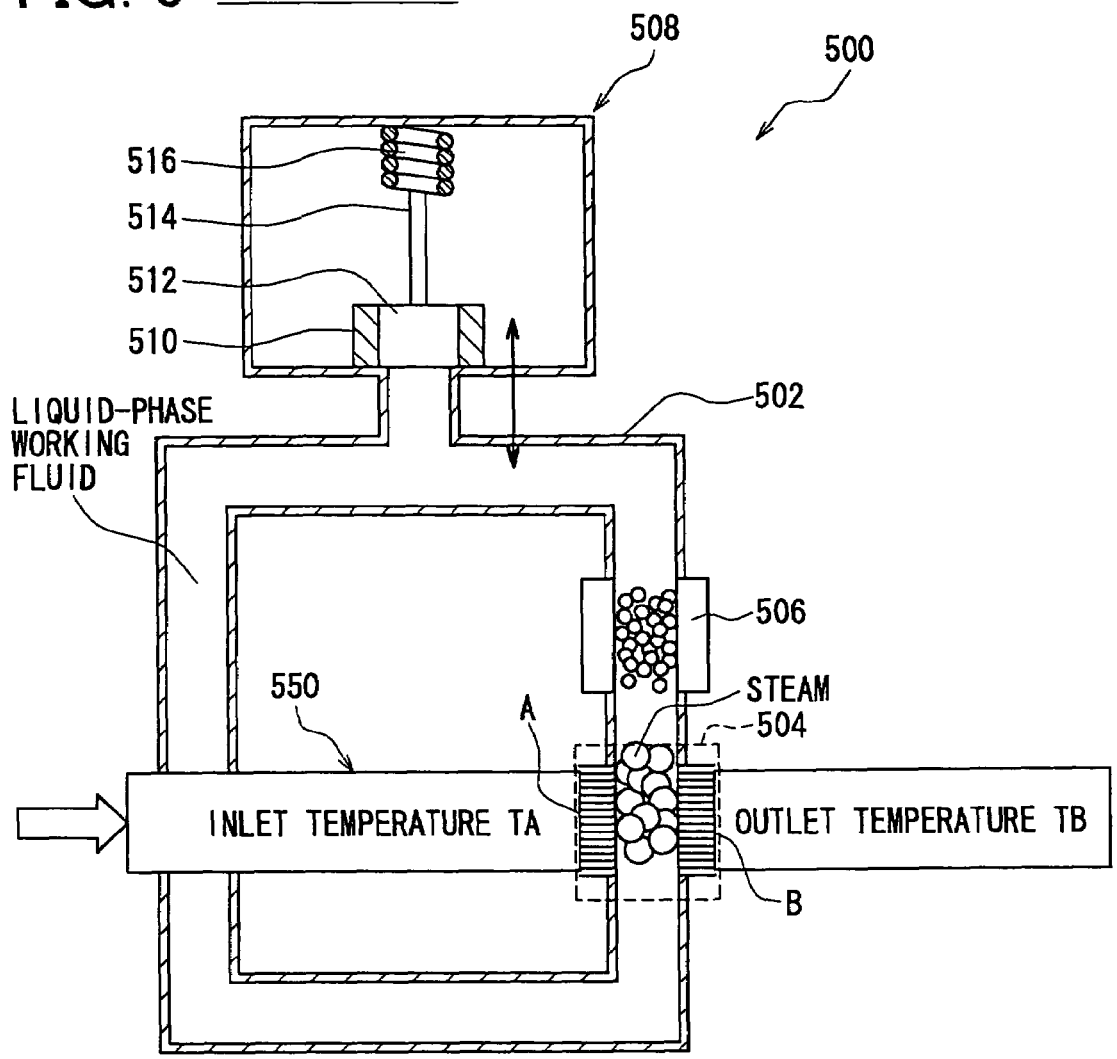
FIG. 9 is a schematic view showing a heating device of the steam engine according to another related art.
Figure 10:
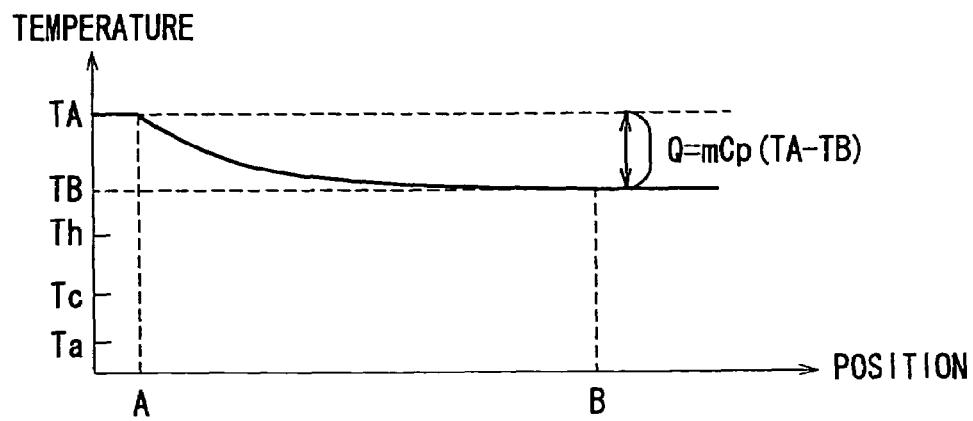
FIG. 10 is a graph showing relation between position and temperature of the heating fluid passing through a heating pipe.

In this embodiment, the heat exchange efficiency between the exhausted gas and the working fluid in the fluid container 8 becomes better than that in the apparatus shown in FIG. 9. Namely, the exhausted gas flowing through exhaust pipe 210 supplies the heat energy to the working fluid in the first and second heating portions 32 and 36, whereas the exhausted gas is emitted from the heating device 504 shortly after the heat exchange is performed at the heating device in the apparatus of FIG. 9. Thus, the output of the steam engine 1 (driving power of the piston 104) is improved corresponding to the increase of the heat exchange efficiency.

Furthermore, in this embodiment, as shown in FIG. 7, the temperature of the exhausted gas passed through the second heating portion 36 goes down from "Tg1" to "Tg2", which is lower than "Th". This means that the heat energy of the exhausted gas lower than the boiling temperature "Th" of the working fluid in the fluid container 8 is made use of heating the working fluid in the loop pipe 10.

Since the first heating portion 32 and the second heating portion 36 are arranged to be close to each other. Thus, the amount of the heat energy, which would be otherwise lost, can be minimized.

The exhaust pipe 210 can be further modified so that the exhausted gas flows through a further pipe portion of the loop pipe 10 in addition to the first and second pipe portion.

The exhaust pipe 210 is not necessarily made of a pipe through which exhausted gas from the engine flows. The exhaust pipe 210 may be made of a pipe, through which any other types of the heated fluid flows and supplies the heat energy to the working fluid. For example, the exhaust pipe 210 may be made of a heat pipe, through which heated fluid from an incinerator flows.

The third embodiment can be accordingly combined with the first or second embodiment.

What is claimed is:

1. A steam engine comprising:
   a fluid container in which liquid-phase working fluid is filled, the fluid container having a loop pipe for forming a circular fluid passage through which the working fluid is moved back and forth;
   a heating device for heating the working fluid in the fluid container and vaporizing the same;
   a cooling device for cooling down and liquidizing steam, which is vaporized from the liquid-phase working fluid by the heating device; and
   an output device for producing a mechanical energy from self-excited movement of the working fluid generated by a repeated operation of vaporization of the working fluid by the heating device and liquefaction of the working fluid by the cooling device,
   wherein the heating device, the cooling device, and the output device are arranged in this order, and
   the heating device is located at a lower position than the cooling device,
   wherein the steam engine further comprises:
   a first valve arranged in a passage portion of the loop pipe, which is formed between the heating device and the output device and bypasses the cooling device, for opening and closing the passage portion; and
   a second valve arranged in another passage portion of the loop pipe, which is formed between the cooling device and the output device and bypasses the heating device, for opening and closing the other passage portion.

2. A steam engine according to claim 1, further comprising:
   a piston reciprocatingly arranged in the output device, wherein one end of the piston is in contact with the working fluid of the loop pipe, so that the piston is moved in a reciprocating manner in the output device depending on a pressure change of the working fluid;
   a position sensor for detecting a position of the piston; and
   a control unit for controlling the opening and closing conditions of the first and second valves, in accordance with a signal from the position sensor.

3. A steam engine according to claim 2, wherein
   the control unit controls the first and second valves based on the signal from the position sensor, to open the first valve and to close the second valve during a first predetermined period, which is at least a part of a time period covering a boil stroke and an expansion stroke of the piston, wherein the piston is moved in one direction during the boil stroke from its bottom dead center to a middle point of the stroke, and the piston is further moved in the same direction to that of the boil stoke during the expansion stroke from the middle point to its top dead center.

4. A steam engine according to claim 3, wherein the control unit controls the first and second valves based on the signal from the position sensor, to open the first valve and to close the second valve during a second predetermined period, which is at least a time period covering a compression stroke of the piston preceding the boil stroke, wherein the piston is moved in the other direction during the compression stroke from the middle point to the bottom dead center.

5. A steam engine according to claim 4, wherein the first and second predetermined periods are made to be a single continuous period.

6. A steam engine according to claim 3, wherein the control unit controls the first and second valves based on the signal from the position sensor, to close the first valve and to open the second valve during a third predetermined period, which is at least a part of time period covering the boil stroke of the piston.

7. A steam engine according to claim 6, wherein the third predetermined period ends at such a time point close to an end of the boil stroke.

8. A steam engine according to claim 3, wherein the control unit controls the first and second valves based on the signal from the position sensor, to open the first and second valves during a fourth predetermined period, which is a time period covering at least a part of the expansion stroke of the piston and a part of a condensation stroke, wherein the piston is moved in the other direction during the condensation stroke from the top dead center to the middle point of the stroke.

9. A steam engine according to claim 3, wherein the control unit controls the first and second valves based on the signal from the position sensor, to close the first valve and to open the second valves during a fifth predetermined period, which is a time period covering a condensation stroke of the piston, wherein the piston is moved in the other direction during the condensation stroke from its top dead center to the middle point of the stroke.

10. A steam engine according to claim 9, wherein the control unit controls the first and second valves based on the signal from the position sensor, to close the first valve and to open the second valves during a sixth predetermined period, which is a time period covering the expansion stroke of the piston.

11. A steam engine according to claim 10, wherein the fifth and sixth predetermined periods are made to be a single continuous period.

12. A steam engine according to claim 3, wherein the control unit controls the first and second valves based on the signal from the position sensor, to close the first valve and to open the second valves during a seventh predetermined period, which is at least a part of a time period covering a compression stroke preceding the boil stroke, wherein the piston is moved in the other direction during the compression stroke from the middle point of the stroke to its bottom dead center.

13. A steam engine according to claim 3, wherein the control unit controls the first and second valves based on the signal from the position sensor, to open the first and second valves during an eighth predetermined period, which is at least a part of a time period covering the boil stroke.

14. A steam engine comprising:
a fluid container in which liquid-phase working fluid is filled;
a heating device for heating the working fluid in the fluid container; and
a cooling device for cooling down steam, which is heated and vaporized from the liquid-phase working by the heating device,
wherein the liquid-phase working fluid is moved back and forth in the fluid container to generate a self-excited movement of the working fluid by a repeated operation of vaporization and liquefaction of the working fluid by the heating device and the cooling device, and
wherein the heating device comprises;
a heating pipe through which the heating fluid flows;
a first heating portion provided at a first portion of the fluid container, at which the heat from the heating fluid is transmitted to the liquid-phase working fluid when the heating fluid passes through the first heating portion; and
a second heating portion provided at a second portion of the fluid container, at which the heat from the heating fluid is transmitted to the liquid-phase working fluid when the heating fluid passes through the second heating portion after having passed through the first heating portion.

15. A steam engine according to claim 14, wherein the liquid-phase working fluid is heated at the second heating portion, by the heating fluid passing through the heating pipe, to a temperature close to but below boiling temperature of the working fluid, and
the liquid-phase working fluid is vaporized at the first heating portion, by the heating fluid passing through the heating pipe.

16. A steam engine according to claim 14, wherein the first and second heating portions are provided adjacent to each other.

17. A steam engine according to claim 14, wherein at least one of the first and second heating portions has fins for increasing an efficiency of heat transfer between the heating fluid in the heating pipe and the working fluid in the fluid container.

18. A steam engine according to claim 14, further comprising:
an output device for producing a mechanical energy from the self-excited movement of the working fluid in the fluid container.

19. A steam engine according to claim 14, wherein:
the heating pipe is an exhaust pipe of an internal combustion engine, and the heating fluid flowing through the heating pipe is exhausted gas emitted from the engine.

* * * * *